United States Patent
Sulatisky et al.

[11] Patent Number: 6,003,543
[45] Date of Patent: Dec. 21, 1999

[54] ELECTRONIC GAS REGULATOR

[75] Inventors: Michael T Sulatisky, Saskatoon; Nicholas P White, Don Mills, both of Canada

[73] Assignee: Gas Technology Canada, Don Mills, Canada

[21] Appl. No.: 08/873,160

[22] Filed: Jun. 11, 1997

[30] Foreign Application Priority Data

Oct. 12, 1996 [GB] United Kingdom ............... 961224

[51] Int. Cl.⁶ .................................. F16K 31/12
[52] U.S. Cl. .................... 137/487.5; 251/129.05
[58] Field of Search .............. 137/487.5; 251/129.05, 251/129.08; 123/527

[56] References Cited

U.S. PATENT DOCUMENTS

| | | | |
|---|---|---|---|
| 3,800,794 | 4/1974 | Georgi | 137/487.5 X |
| 4,373,549 | 2/1983 | Nalepa | 137/487.5 |
| 4,436,110 | 3/1984 | Leeuwma et al. . | |
| 4,513,728 | 4/1985 | Ullman | 123/527 |
| 4,690,163 | 9/1987 | Steinemann | 137/487.5 X |
| 4,892,286 | 1/1990 | Reinicke | 251/129.05 |
| 4,917,349 | 4/1990 | Surjaatmadja | 137/487.5 |
| 5,020,564 | 6/1991 | Thoman et al. | 137/487.5 X |
| 5,105,790 | 4/1992 | Nye, Jr. . | |
| 5,343,847 | 9/1994 | Chasteen | 123/527 |
| 5,673,673 | 10/1997 | Beck | 123/527 |

FOREIGN PATENT DOCUMENTS

| | | |
|---|---|---|
| 0 420 599 A2 | of 0000 | European Pat. Off. . |
| 1 565 706 | of 0000 | Ireland . |
| 2 121 563 | of 0000 | United Kingdom . |
| 2 295 249 | of 0000 | United Kingdom . |

Primary Examiner—Denise L. Ferensic
Assistant Examiner—Joanne Y. Kim
Attorney, Agent, or Firm—Murray E. Thrift; Adrain D. Battison

[57] ABSTRACT

A gas regulator has a has an internal gas chamber and a solenoid valve that controls gas flow into the clamber. A pressure monitor monitors the pressure in the chamber and controls the operation of the solenoid valve to produce a desired pressure in the chamber. The solenoid control signal is a pulsed signal with a variable pulse width, frequency or both. The pressure maintained in the chamber may itself be varied by altering the set point pressure, for example according to the operating parameters of an engine.

11 Claims, 6 Drawing Sheets

ELECTRONIC GAS REGULATOR

FIELD OF THE INVENTION

The present invention relates to the regulation of fluid pressure. It has particular application to the control of gas mass flow rates through the control of pressure. It is especially useful in controlling the flow of a gaseous fuel supplied to an internal combustion engine, for example in automotive use where control of fuel is important for performance and emission control.

BACKGROUND

In the preferred applications the final control of the gas flow to an engine is typically by a venturi (carburation system) or a solenoid valve (fuel injection system). Both of these require precise and accurate control of the input pressure to the device. In automotive use the pressure in the fuel storage container may range from 0.6 MPa to over 30 MPa (90 to 4500 psig) necessitating the use of sophisticated regulation systems to achieve a constant output pressure with the requisite variable mass flow rate.

The known regulators are mechanical. These regulators are preset by the manufacturer and may be difficult to adjust correctly after installation. Recent automotive regulations in many countries prohibit adjustment to a regulator after installation as tampering with the emission system. This requires that the regulator remains in tolerance for long periods, normally amounting to a number of years or a representative cumulative distance.

Existing natural gas vehicle (NGV) regulators for fuel injection applications are mechanical systems with either one or two stages of pressure regulation. Three or four stages of pressure regulation are used in conventional carburetor-mixer NGV fuel systems. Mechanical regulators can be designed to address many of the problems, but this may increase the number of moving parts, which in turn may affect reliability and cost. Although these systems have demonstrated good performance in many applications, there are problems associated with their use.

Droop: One difficulty with mechanical regulators is that the output pressure decreases or droops, when the fuel flow rate is increased significantly, which frequently happens in automotive applications. Typically, the fuel flow rate increases by a factor of 30 on acceleration from idle to maximum engine speed at wide open throttle. This can cause pressure droop between 70 and 140 kPa (10 to 20 psig) for mechanical regulators. Pressure droop complicates the calibration of fuel injected engines because there must be compensation for the pressure reduction in the calibration tables to maintain a proper air fuel ratio. Systems with droop require sophisticated and expensive compensation systems.

Resonance: The spring and diaphragm arrangement in a mechanical regulator may be sensitive to resonance. The flow dynamics of the manifold that connects the fuel injectors to the regulator can be prone to pressure resonances of 70 to 210 kPa (10 to 30 psig).

Hysteresis: The spring and diaphragm arrangement in a mechanical regulator may be sensitive to hysteresis which can result in a pressure reduction of 70 kPa (10 psig).

Temperature: The spring and diaphragm arrangement in a mechanical regulator may be sensitive to temperature effects. Elastomeric diaphragms are less flexible in cold weather, which decreases the ability of the fueling system to respond to changes in vehicle operation.

Transient response:

Mechanically regulated systems cannot compensate for the inertial lag from injectors on fuel injected natural gas vehicles. Current injectors have an opening time of up to 4 milliseconds, which is a significant portion of their pulse width operation.

The present invention aims at a system that ameliorates the problems with the mechanical regulators of the prior art.

SUMMARY

According to one aspect of the present invention there is provided a fluid regulator comprising:

a regulator housing having a fluid inlet;

a solenoid valve coupled to the housing for controlling the flow of fluid into the housing through the fliuid inlet from a source of fluid;

pressure monitoring means for monitoring fluid pressure in the housing;

control means coupled to the pressure monitoring means and to the solenoid valve for controlling operation of the solenoid valve to produce a desired fluid pressure in the housing.

A regulator of this sort, composed of one solenoid valve and a controller, which will normally be entirely electronic, has only one moving part. Other advantages of this system over conventional mechanical systems include reduced production costs, increased accuracy, an increased dynamic range, reduced size and improved reliability.

The control means preferably include means for establishing a set point pressure to which the desired pressure corresponds and means for controllably varying the set point pressure. The variable pressure provides an increased dynamic range and permits the system to increase the flow rate very quickly to meet rapidly varying gas requirements. It will also reduce wear on the solenoid valve by reducing the frequency of operation. In some cases the variable pressure system can improve safety as the pressure can be reduced to zero to use the regulator as a shut-off valve.

The control means preferably deliver a pulsed electrical signal to the solenoid valve for operating the valve. Mass flow through the valve is controlled by controllably varying the electrical signal. The signal variations may be variations in the pulse width, the pulse frequency or both.

The regulator may be incorporated into the fuel supply for an internal combustion engine, between the engine and a gas supply. In this application, the system may include means for monitoring certain control parameters of the engine. These may include throttle position, manifold vacuum, engine speed and others indicative of the fuel demand on the engine. The control means may then include means for establishing a set point pressure to which the desired gas pressure corresponds and means for varying the set point pressure according to the monitored control parameters. This is particularly useful in automotive applications where the fuel demand can vary widely and rapidly.

The regulator of the invention can be designed to require less auxiliary heating, or none whatsoever. The reasons for this are as follows;

Although gas temperature at the orifice of the solenoid valve can be significantly below freezing, there is not enough time for ice to form in the orifice because of non-equilibrium effects in the natural gas-water mixture.

The high velocity of the gas stream (sonic) keeps the orifice free from ice blockage.

High frequency movement of the valve stem and ball against the valve seat prevents ice from forming.

The electrical energy from the solenoid valve is dissipated as heat in the gas stream.

According to another aspect of the present invention there is provided a method of regulating the pressure of a gas, said method comprising:

supplying the gas to a regulator chamber through a solenoid valve;

operating the solenoid valve with a pulsed electrical signal; and controlling the electrical signal to obtain a desired output pressure in the chamber.

While the method and apparatus are described herein in the environment of gas pressure regulation, the principles of the invention are also applicable to the control of pressure in a liquid.

BRIEF DESCRIPTION OF THE DRAWINGS

In the accompanying drawings, which illustrate an exemplary embodiment of the present invention.

DETAILED DESCRIPTION

Figure 1:
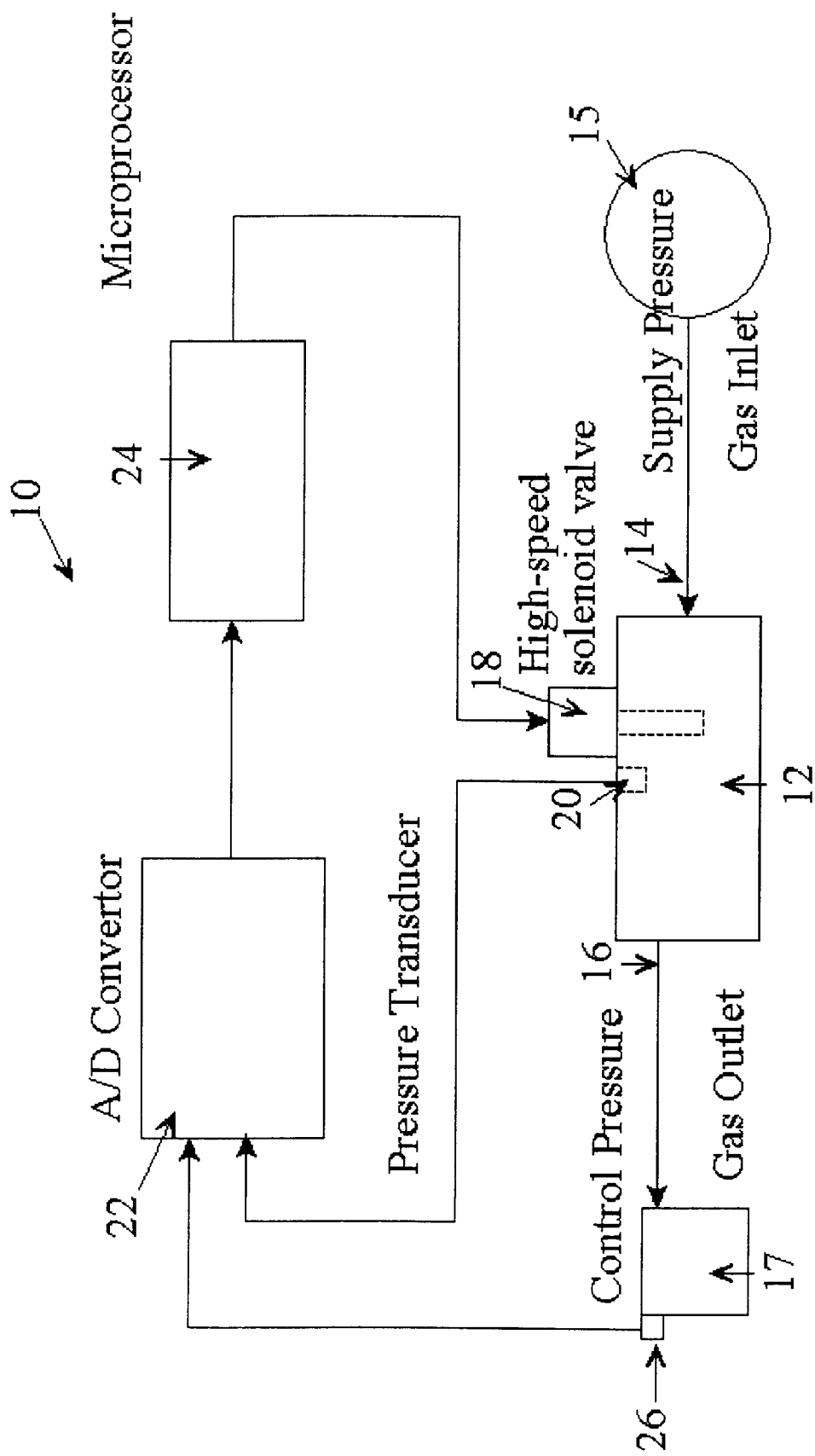
FIG. 1 is a schematic illustration of a pressure regulator according to the present invention.

Referring to the accompanying drawings, and especially to FIG. 1, there is illustrated an electronic regulator 10 that includes a regulator housing 12 with a gas inlet 14 for receiving gas at a supply pressure from a gas source 15 and an outlet 16 for discharging gas at a controlled pressure to the fuel system of an internal combustion engine 17. A high speed solenoid valve 18 is coupled to the housing. It is normally closed and blocks flow from the gas inlet to the gas outlet. The regulator is preferably built into the gas source 15 to eliminate any high pressure gas line between the two components.

A pressure transducer 20 is mounted on the housing to monitor the gas pressure downstream from the solenoid valve. The signal from the pressure transducer is delivered to an analog to digital converter 22 which serves as an interface for the pressure measurement. The output from the converter is delivered to a microprocessor 24 which in turn controls operation of the solenoid valve 18. The microprocessor contains algorithms that provide for proportional-integral-derivative control of the control system. Proportional control allows for fast response. Integral control reduces the steady state error between the set point pressure and the measured pressure to zero. Derivative control increases the response to rapid changes in flow demand. Instrumentation 26 on the engine monitors engine control parameters that are measures of the fuel demand of the engine. The output from this instrumentation is also delivered to the microprocessor which varies the operation of the solenoid to meet the engine fuel demand.

A mathematical model was developed to investigate the controllability of a regulator designed according to this concept, and to help develop control algorithms for the regulator.

The pressure control model is based on the solution to the transient equations for the conservation of mass and energy in a control volume. Models were also developed for pulse-width modulation, fluid injection into a control volume, PID control, and heat transfer from the walls. A frequency modulation model was also developed.

Figure 2:
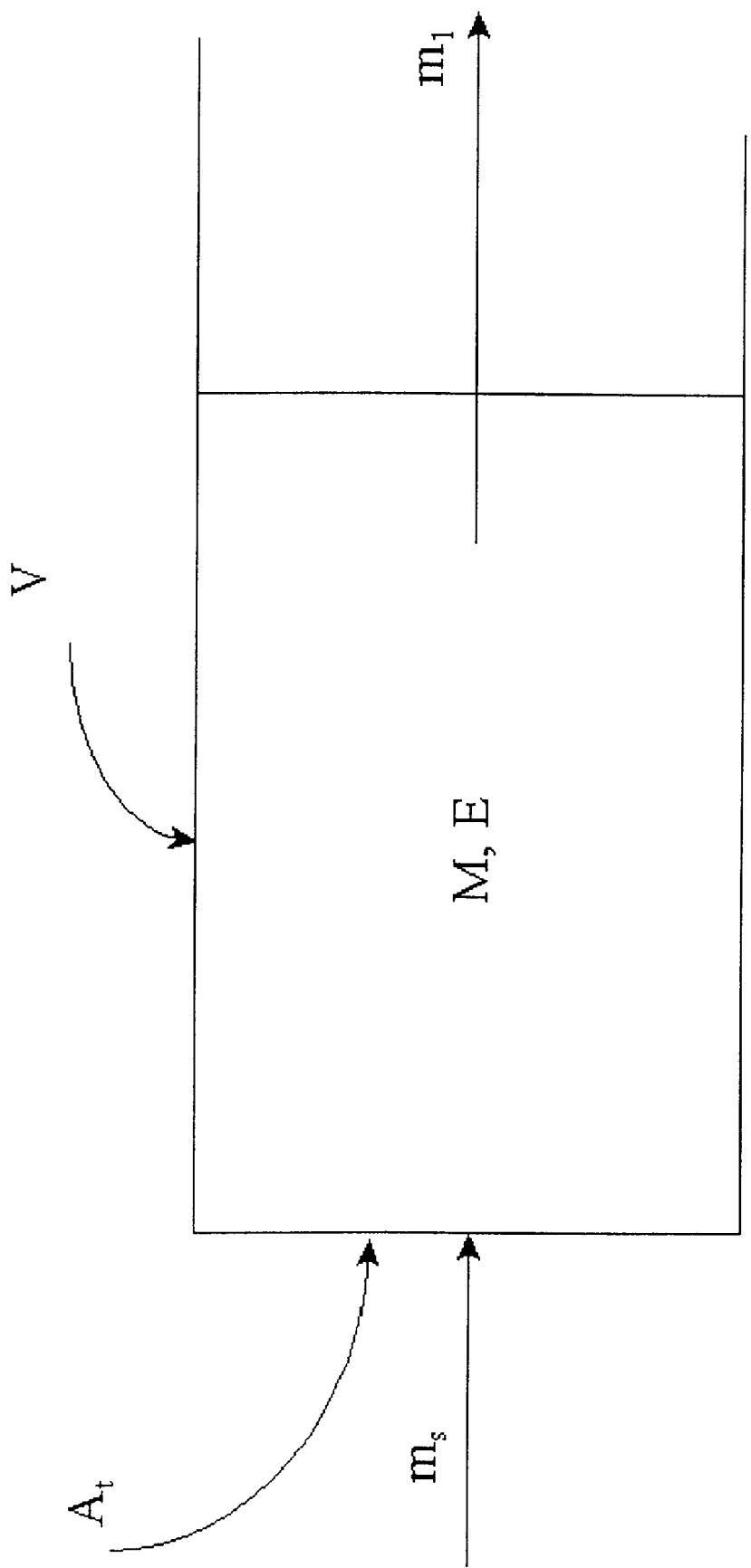
FIG. 2 schematically illustrates the regulator control volume.
Figure 3:
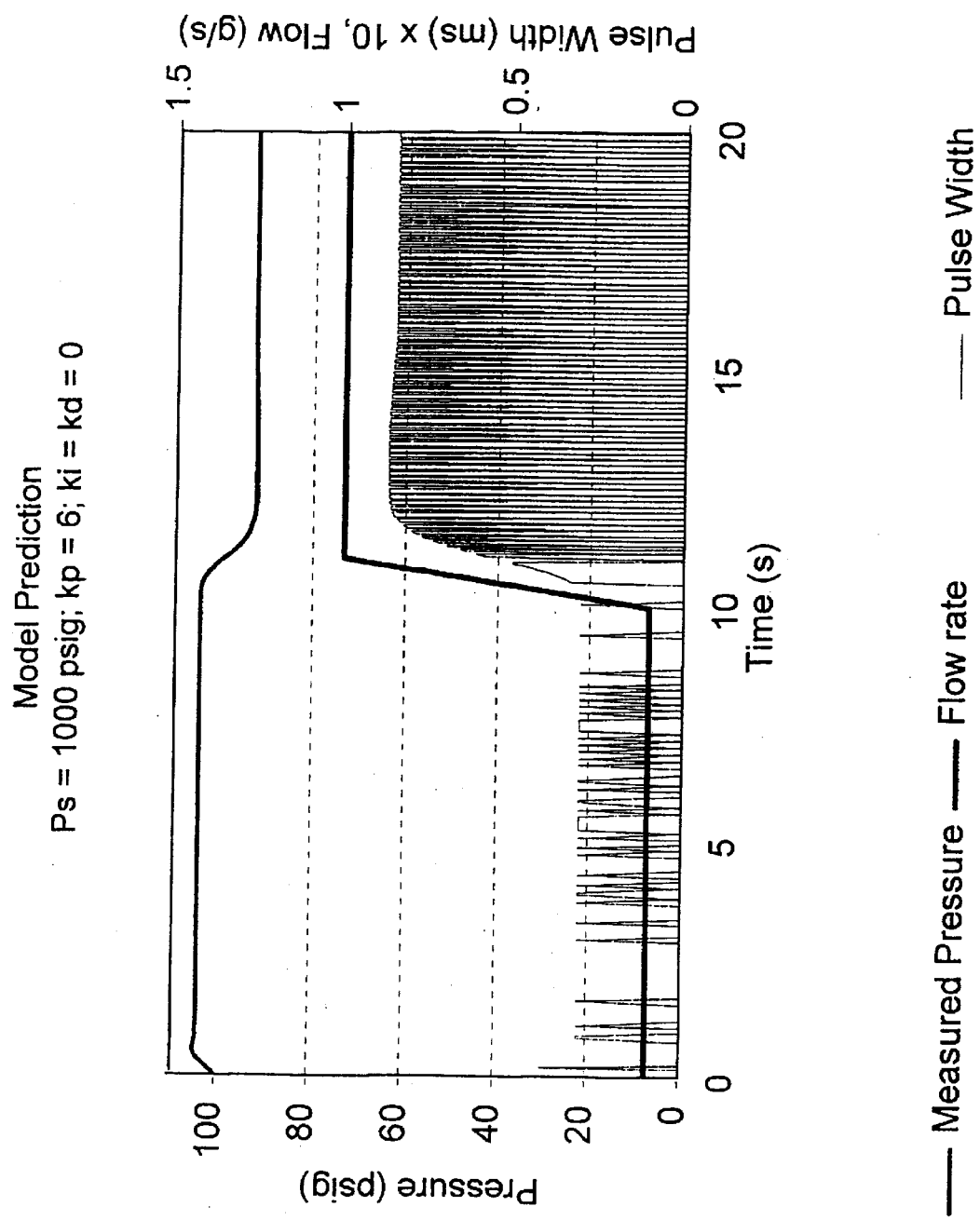
FIG. 3 is a plot illustrating the predicted characteristics of a modeled regulator according to the present invention with a proportional controller.

As illustrated in FIG. 2, the regulator pressure chamber can be represented by a control volume of volume, V. The fluid has a mass, M, and energy, E, as shown in FIG. 2. Natural gas injection is represented by the inlet mass flow, $m_s$, through the cross-sectional area of the throat, $A_t$. The outlet mass flow rate or load flow rate, $m_1$, is represented by a look up table of flow rates in time.

The following equations were solved using a first-order finite difference scheme.

Conservation of Mass $$\frac{dM}{dt} = m_s - m_l \qquad (1)$$

where

M=mass of fluid in the control volume (kg)

$m_s$=supply mass flow rate (kg/s)

$m_1$=load mass flow rate (kg/s)

Conservation of Energy $$\frac{dE}{dt} = m_s\left(C_pT_t + N_{is}\frac{v_t^2}{2}\right) - m_l\left(C_pT + \frac{v^2}{2}\right) + q \qquad (2)$$

where

E=energy in control volume (J)

$N_{is}$=isentropic efficiency v=exit velocity (m/s)

$C_P$=specific heat at constant pressure (J/kgK)

$C_v$=specific heat at constant volume (J/kgK)

P=regulator pressure (Pa)

T=regulator temperature (K)

$\rho$=regulator density (kg/m$^3$)

q=heat addition (W)

The following first-order integration routine was used for Equation 1:

$$M^{t+1} = M^t + (m_s - m_1)\Delta t \qquad (3)$$

where $\Delta t$=time step(s)

A similar integration scheme was used for Equation 2.

The fluid enters the control volume at sonic velocity, $c_t$ if the pressure ratio, $P_s/P$ is greater than the critical pressure ratio 0.528, as indicated by the following equation:

$$v_t = c_t = \sqrt{\gamma R T_t}$$

where

R=gas constant (J/kg K)

$\gamma = C_p/C_v$

The temperature, $T_t$ and pressure, $P_t$ at the throat are defined by the following equations for isentropic flow:

$$T_t = \frac{2}{1+\gamma}T_s$$

-continued $$P_t = P_s \left(\frac{2}{1+g}\right)^{\frac{g}{(1-g)}}$$

where $P_s$=supply pressure (kPa)

$T_s$=supply temperature (K)

The mass flow rate into the control volume, $m_s$, was calculated by the following equation for sonic flow:

$$m_{si} = C_d A_t \frac{P_s}{\sqrt{RT_s}} \gamma^{0.5} \left(\frac{2}{\gamma+1}\right)^{\frac{(\gamma+1)}{2(\gamma-1)}}$$

where $C_d$=discharge coefficient $A_t$=area of the throat (m²)

The opening time of the solenoid valve was modeled by the following equation:

$$m_s = m_{si}\frac{\Delta t}{\tau_0} + \left(1 - \frac{\Delta t}{\tau_0}\right)m_{s0}$$

where $m_{si}$=mass flow rate at time t (kg/s)

$m_{so}$=mass flow rate at time t-$\Delta$t (kg/s)

$\Delta$t=time step(s)

$\tau_o$=opening time constant of solenoid valve(s)

$$\rho = \frac{M}{V}$$

$$T = \frac{E}{MC_v}$$

Equation of State $P = z\rho RT$ where z=compressibility factor

Wall Heat Transfer $q = hA_w(T_w - T)$ where h=heat transfer coefficient of the wall (W/m²/K)

$A_w$=surface area of the wall (m²)

$T_w$=wall temperature (K)

The measured pressure, $P_m$ and the error in the pressure, $E_r$ were represented by the following equations:

$$\tau_m \frac{dP_m}{dt} + P_m = P$$

$$E_r = P_m - P_{sp}$$

where $P_m$=measure pressure (Pa)

$\tau_m$=time constant of the pressure transducer(s)

$P_{sp}$=set-point pressure of the controller (Pa)

The error signal, $E_r$ is multiplied by the proportion gain, $k_p$ the integral gain, $k_i$ and derivative gain, $k_d$, to calculate the controller output, $F_{af}$ and pulse width, $T_i$, as follows:

$$F_{af} = \left(k_p + \int k_i dt + k_d \frac{d}{dt}\right)E_r$$

Pulse width and frequency modulation are used in the model to control the outlet pressure base on the following relationships:

$T_i = T_b(1+F_{af})$ $f = f_b(1+F_{af})$ where $T_b$=base pulse(s)

$T_i$=pulse width(s)

f=frequency of injection $f_b$=base frequency of injection (Hz =f($p_s$))

Note that $f_b$ is also modified according to the following equation:

$f = f_b + f_0$

For a vehicle application, the frequency of injection can be made proportional to engine speed, obviating the need for frequency modulation according to the above equations.

Figure 4:
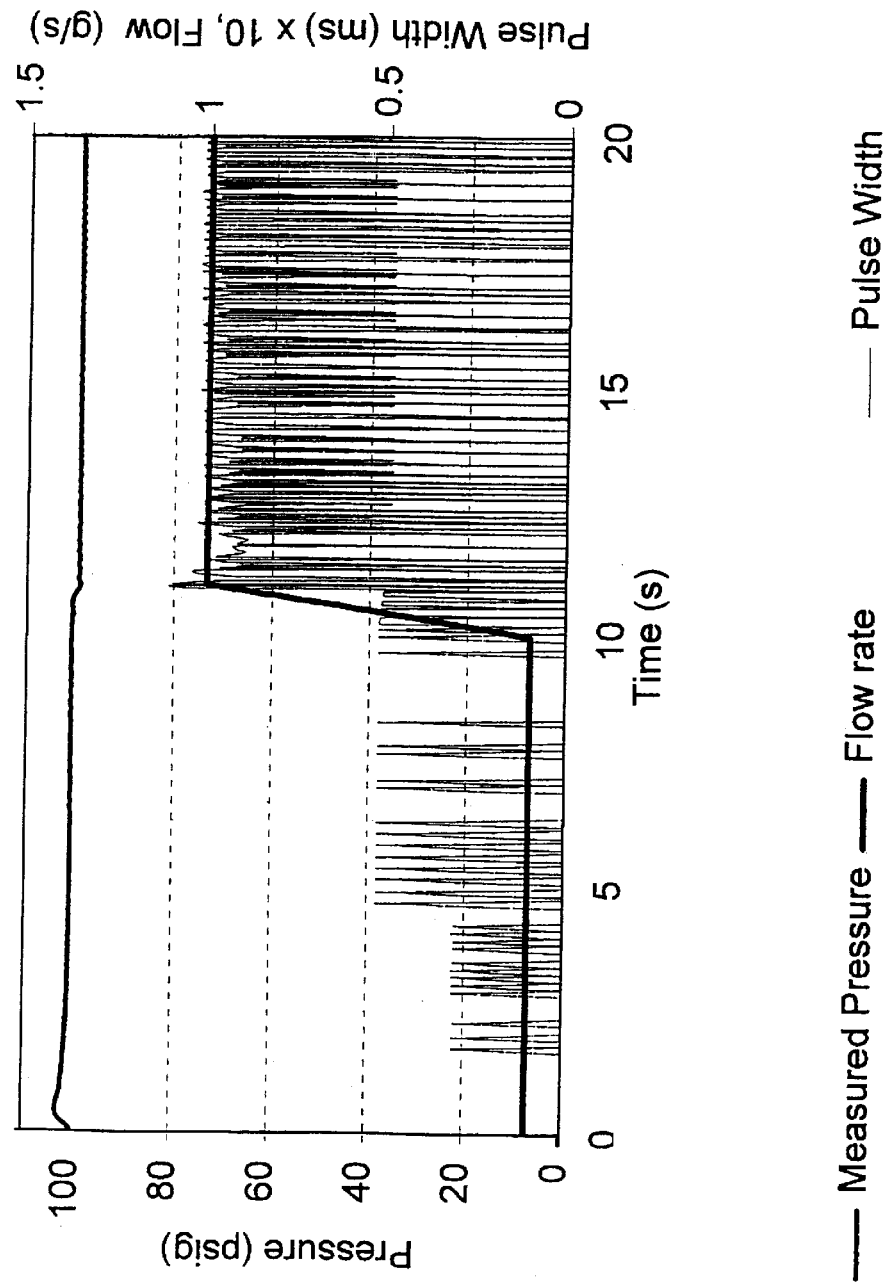
FIG. 4 is a view like FIG. 3 with a proportional-integral-derivative controller.
Figure 5:
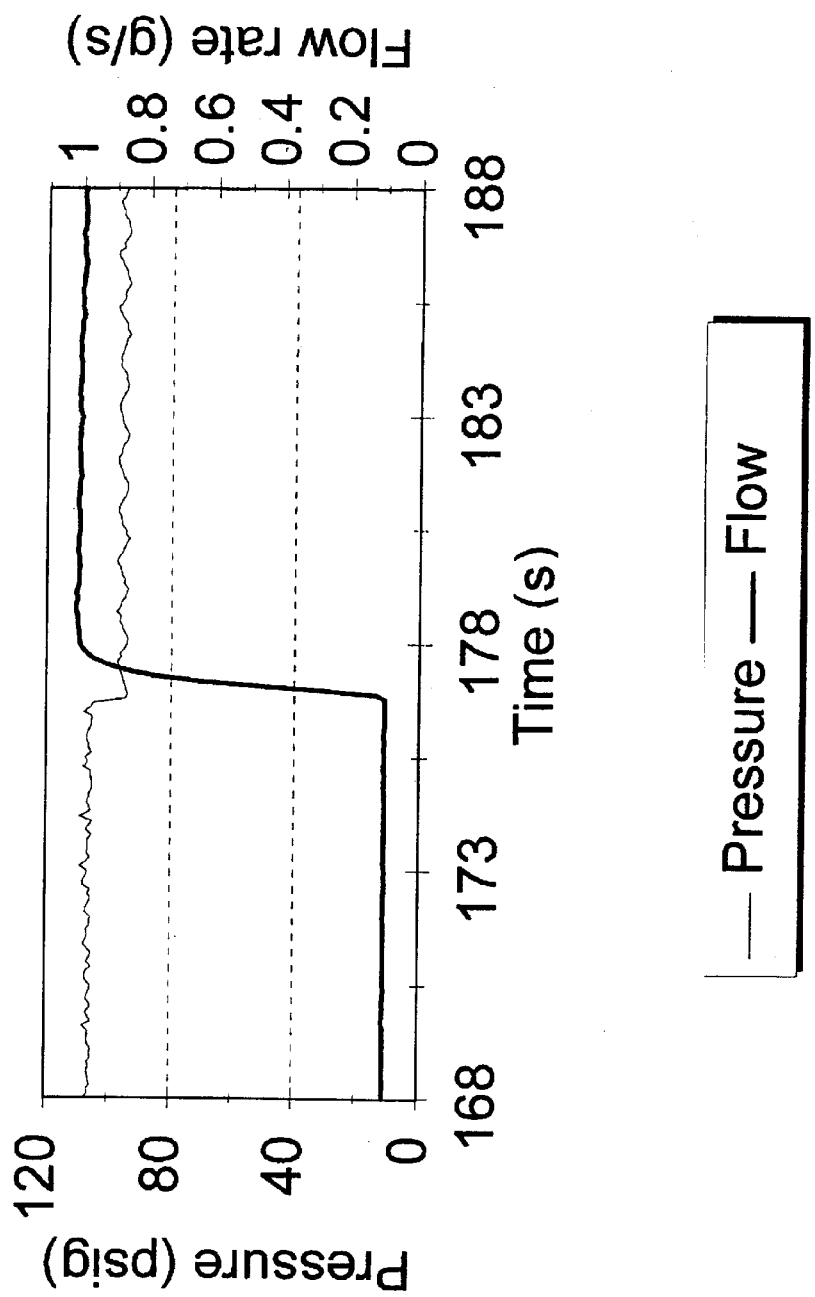
FIG. 5 is a view like FIG. 3 of a prototype regulator.
Figure 6:
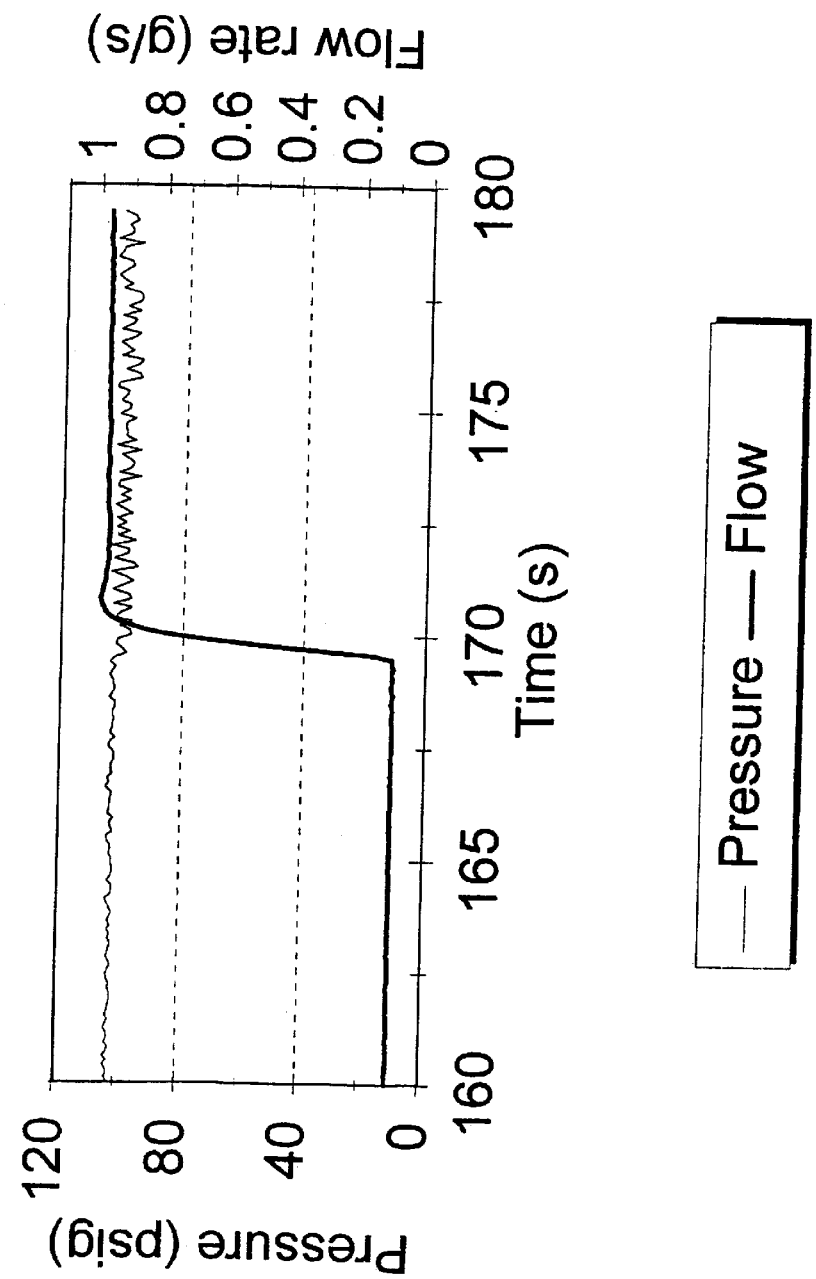
FIG. 6 is a view like FIG. 5 with a proportional-integral control.

The model was run to compare proportional control with proportional-integral-derivative control for the electronic regulator. The flow rate was increased from 0.1 to 1.0 g/s at the 10 second mark as shown in FIG. 2. The controller increased the pulse width from 3 ms to 8.5 ms. The model predicts a droop in pressure of about 100 kPa (14 psig) for proportional control. The model was run at a supply pressure of 6.9 MPa (1000 psig), a control pressure of 820 kPa (105 psig) and a proportional gain $k_p$=6. The droop is reduced to about 15 kPa (2 psig) for the proportional-integral-derivative controller shown in FIG. 4. For this case $k_i$=9 and $k_d$=2. Similar improvements were found in a prototype bench test of the regulator as illustrated in FIGS. 5 and 6. In this case, the improved results were achieved using a proportional-integral controller.

An electronic pressure regulator according to the present invention may be used as a separate system similar to conventional regulators, or it may be a system integrated into the central computer of a motor vehicle. The electronic regulator can be configured to permit electronic control of the set-point pressure of the regulator to increase the dynamic range of the fuel system.

While one embodiment of the present invention has been described in the foregoing, it is to be understood that other embodiments are possible within the scope of the invention and are intended to be included within the scope of this application.

We claim:

1. A gas pressure regulator for regulating the pressure of a gas flowing from a source of the gas under pressure to a device for using the gas, the regulator comprising:

a regulator housing having a gas inlet for receiving the gas and a gas outlet that is open to allow the free flow of the gas from the housing;

a high speed solenoid valve coupled to the housing in association with the gas inlet, the solenoid valve having an open state in which the valve is fully open and allows the flow of gas into the housing through the gas inlet from the source of gas under pressure and a closed state in which the valve is fully closed and prevents the flow of gas into the housing through the gas inlet;

pressure monitoring means for monitoring the actual gas pressure in the housing;

control means coupled to the pressure monitoring means and to the solenoid valve for controlling operation of the solenoid valve to produce a desired gas pressure in the housing, the control means comprising:

means for delivering a pulsed electrical signal to the solenoid valve, for switching the valve from one of its open and closed states to the other with each pulse of the signal;

means for establishing a set point pressure to which the desired gas pressure corresponds;

means for comparing the actual gas pressure in the housing with the set point pressure and generating an error value $E_r$ representing the difference;

means for generating a controller output $F_{af}$ according to:

$$F_{af} = \left(k_p + \int k_i dt + k_d \frac{d}{dt}\right) E_r$$

where $k_p$, $k_i$ and $k_d$ are constants and at least $k_p$ and $k_i$ are non-zero; and signal varying means for varying the pulsed electrical signal according to the controller output.

2. A gas pressure regulator according to claim 1 wherein the control means comprise means for controllably varying the set point pressure.

3. A gas pressure regulator according to claim 1 wherein the signal varying means comprise means for controllably varying the pulse width of the electrical signal.

4. A gas pressure regulator according to claim 3 wherein the signal varying means comprise means for varying the pulse frequency of the electrical signal.

5. A gas pressure regulator according to claim 3 wherein the control means comprise means for generating a variable demand signal representing a variable gas flow rate and means for varying the pulse frequency of the electrical signal according to the demand signal.

6. In combination:

an internal combustion engine;

a supply of gaseous fuel; and a gas pressure regulator coupled to the engine and the supply of fuel for controlling the pressure of fuel delivered from the supply to the engine, said pressure regulator comprising:

a regulator housing having a gas inlet for receiving the fuel from the supply and a gas outlet that is open to allow the free flow of the fuel from the housing to the engine;

a high speed solenoid valve coupled to the housing in association with the gas inlet, the solenoid valve having an open state in which the valve is fully open and allows the flow of gas into the housing through the gas inlet from a source of gas under pressure and a closed state in which the valve is fully closed and prevents the flow of gas into the housing through the gas inlet;

pressure monitoring means for monitoring gas pressure in the housing; and control means coupled to the pressure monitoring means and to the solenoid valve for controlling operation of the solenoid valve to produce a desired gas pressure in the housing, the control means comprising:

means for delivering a pulsed electrical signal to the solenoid valve, for switching the valve from one of its open and closed states to the other with each pulse of the signal;

means for establishing a set point pressure to which the desired gas pressure corresponds;

means for comparing the actual gas pressure in the housing with the set point pressure and generating an error value $E_r$ representing the difference;

means for generating a controller output $F_{af}$ according to:

$$F_{af} = \left(k_p + \int k_i dt + k_d \frac{d}{dt}\right) E_r$$

where $k_p$, $k_i$ and $k_d$ are constants and at least $k_p$ and $k_i$ are non-zero; and signal varying means for varying the pulsed electrical signal according to the controller output.

7. A combination according to claim 6 wherein the control means comprise:

means for monitoring control parameters of the engine;

means for establishing a set point pressure to which the desired gas pressure corresponds; and means for varying the set point pressure according to the control parameters.

8. A method of regulating the pressure of a gas flowing from a source of the gas under pressure to a device for using the gas, said method comprising:

supplying the gas from said source to a regulator chamber through a solenoid valve having on and off states;

monitoring the actual gas pressure in the housing;

applying a pulsed electrical signal to the solenoid valve and thereby switching the valve between its on and off states with each pulse of the signal; and controlling operation of the solenoid valve to obtain a desired output pressure in the chamber, the control process comprising:

establishing a set point pressure to which the desired gas pressure corresponds;

comparing the actual gas pressure in the housing with the set point pressure;

generating an error value $E_r$ representing the difference between the actual gas pressure in the housing and the set point pressure;

generating a controller output $F_{af}$ according to:

$$F_{af} = \left(k_p + \int k_i dt + k_d \frac{d}{dt}\right) E_r$$

where $k_p$, $k_i$ and $k_d$ are constants and at least $k_p$ and $k_i$ are non-zero;

cyclically operating the solenoid valve with the pulsed electrical signal;

varying the pulsed electrical signal according to the controller output; and allowing gas at the desired gas pressure to flow from the regulator chamber to the device for using the gas.

9. A method according to claim 8 wherein the step of varying the electrical signal comprises varying the pulse width of the signal.

10. A method according to claim 9 wherein the step of varying the electrical signal comprises varying the pulse frequency of the electrical signal.

11. A method according to claim 8 wherein the step of varying the electrical signal comprises varying the pulse frequency of the electrical signal.

* * * * *